2,910,445

INTERPOLYMERS COMPRISING VINYLPHENYL ALIPHATIC AMINOCARBOXYLIC ACID COMPOUNDS

Richard A. Mock, Charles A. Marshall, and Leo R. Morris, Midland, Mich., assignors to The Dow Chemical Company, Midland, Mich., a corporation of Delaware No Drawing. Application October 12, 1956
Serial No. 615,467

12 Claims. (Cl. 260—2.1)

This invention pertains to addition interpolymers comprising the product of polymeric combination of at least one vinylphenyl aliphatic aminocarboxylic acid compound and at least one other polymerizable ethylenically unsaturated compound.

One of the objects of this invention is to provide resinous polymers that contain an appreciable proportion of functional groups that are capable of forming chelate structures with metal ions.

Another object is to provide such polymers that contain a plurality of $\alpha$- or $\beta$-aminocarboxylic acid groups.

Another object is to provide such polymers that contain a vinylphenyl aliphatic $\alpha$- or $\beta$-aminocarboxylic acid compound polymerically combined therein.

Other objects and advantages of the invention will be evident in the following description.

The objects of this invention are attained in new resinous polymers that are obtained by polymerizing polymerizable compositions that comprise in appreciable proportions:

(A) at least one vinylphenyl aliphatic aminocarboxylic acid compound having the generic formula

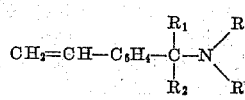

wherein the symbol $R_1$ represents a radical selected from the group consisting of —H, —$CO_2M$ and —$CH_2CO_2M$, the symbol $R_2$ represents a radical selected from the group consisting of —H and —$CH_3$, each of the symbols $R_3$ and $R_4$ individually represents a radical selected from the group consisting of —H, —$CH_3$ —$CH_2$—$C_6H_4$—$CH$=$CH_2$
—$CH_2CO_2M$
—$CH_2CH_2CO_2M$
—$CH(CO_2M)CH_2CO_2M$
—$CH_2CH_2$—$N(CH_2CO_2M)_2$
—$CH_2CH_2CH_2$—$N(CH_2CO_2M)_2$ and

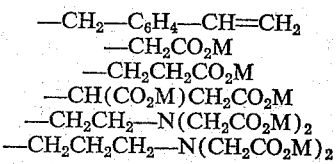

where $n$ is an integer from 1 to 4 and $m$ is an integer from 0 to 2, and M is a member of the group consisting of hydrogen, ammonium bases, metals and lower alkyl radicals, and wherein at least one of the groups represented by the symbols $R_1$, $R_3$ and $R_4$ contains a carboxyl group; and (B) at least one polymerizable ethylenically unsaturated compound that is different from the vinylphenyl aliphatic aminocarboxylic acid compound just identified in (A).

Specific examples of polymerizable vinylphenyl aliphatic $\alpha$- and $\beta$-aminocarboxylic acids of the type A above are as follows:

N,N-bis(ar-vinylbenzyl)glycine
N-(ar-vinylbenzyl)sarcosine
N-(ar-vinylbenzyl)alanine
N,N-bis(ar-vinylbenzyl)alanine
N,(ar-vinylbenzyl)-$\beta$-alanine
N,N-bis(ar-vinylbenzyl)-$\beta$-alanine
N-(ar-vinylbenzyl)-2-aminobutyric acid
N-(ar-vinylbenzyl)-2-aminoisobutyric acid
N-(ar-vinylbenzyl)isovaline
N-(ar-vinylbenzyl)valine
N-(ar-vinylbenzyl)norvaline
N-(ar-vinylbenzyl)leucine
N-(ar-vinylbenzyl)isoleucine
N-(ar-vinybenzyl)iminodiacetic acid
N-(ar-vinylbenzyl)-2-(vinylphenyl)glycine
N-carboxymethyl-N-(ar-vinylbenzyl)aspartic acid
2-(vinylphenyl)iminodiacetic acid
2-(vinylphenyl)nitrilotriacetic acid
N-(ar-vinylbenzyl)iminodiacetic acid
N-carboxymethyl-N-(ar-vinylbenzyl)alanine
N-carboxymethyl-N-(ar-vinylbenzyl)-$\beta$-alanine
N-carboxymethyl-N-(ar-vinylbenzyl)-2-aminobutyric acid
N-carboxymethyl-N-(ar-vinylbenzyl)-2-aminoisobutric acid
N-carboxymethyl-N-(ar-vinylbenzyl)isovaline
N-carboxymethyl-N-(ar-vinylbenzyl)valine
N-carboxymethyl-N-(ar-vinylbenzyl)norvaline
N-carboxymethyl-N-(ar-vinylbenzyl)leucine
N-carboxymethyl-N-(ar-vinylbenzyl)isoleucine
N-(ar-vinylbenzyl)aspartic acid
N,N-bis(ar-vinylbenzyl)aspartic acid
N-(ar-vinylbenzyl)-3,3'-iminodipropionic acid
2-(vinylphenyl)glycine
3-(vinylphenyl)-$\beta$-alanine
3-(vinylphenyl)-3-aminobutyric acid
N-carboxymethyl - N - (ar - vinylbenzyl) - 2 - (vinylphenyl)glycine These vinylphenyl aliphatic $\alpha$- and $\beta$-aminocarboxylic acids are described and claimed, together with suitable ways of preparing the same, in a concurrently filed application for Letters Patent, Serial Number 615,509, now United States Patent 2,840,603.

Some of these vinylphenyl aliphatic aminocarboxylic acids are prepared by interaction of ar-vinylbenzyl chloride and aliphatic aminocarboxylic acids having at least one hydrogen atom on the amino group. For instance, N-(ar-vinylbenzyl)iminodiacetic acid with prepared in the following manner.

Into a 5-liter round bottom flask fitted with a mechanical stirrer, reflux condenser, and dropping funnel were placed 133 grams of iminodiacetic acid, 1 liter of water, 1.5 liters of methanol, and a solution of 66 grams of sodium hydroxide in 250 ml. of water. Stirring was begun, and the contents of the flask were heated to reflux. From the dropping funnel there was added to the reaction mixture 153 grams of ar-vinylbenzyl chloride over a period of one hour. After approximately one-fourth of the ar-vinylbenzyl chloride had been added, another portion of 66 grams of sodium hydroxide in 250 ml. of water was added all at once to the reaction mixture, and the addition of ar-vinylbenzyl chloride was continued. Heating of the reaction mixture was discontinued after completion of the addition of the ar-vinylbenzyl chloride, but stirring was continued for a further 30 minutes.

The methanol was distilled from the reaction mixture, and the cooled aqueous residue was four times extracted with 25-ml. portions of chloroform. A small amount of decolorizing carbon was stirred into the aqueous solution and the mixture was filtered. The clear filtrate was heated to drive off traces of chloroform, and was cooled and acidified with concentrated hydrochloric acid to a pH value of 2. The white solid crystalline precipitate that formed was collected on a filter and dried. The crystalline product consisted substantially of N-(ar-vinylbenzyl)iminodiacetic acid and sodium chloride. Recrystallization from water produced substantially pure N-(ar-vinylbenzyl) iminodiacetic acid.

In a similar manner, N,N-bis(ar-vinylbenzyl)glycine was made in the following way.

Into a 1-liter, 3-necked flask was charged 75.1 g. of glycine, 100 ml. of dioxane, and 300 ml. of water at 60° C. To the resulting mixture there were concurrently, separately, and slowly added 76.3 g. of ar-vinylbenzyl chloride and a solution of 77 ml. of 19.5 N sodium hydroxide solution in 75 ml. of water, the additions being made over a 45 minute period with continued stirring while the temperature of the reaction mixture was maintained at 70° C. The rate of addition of the sodium hydroxide solution was such as to maintain the pH value of the reaction mixture in the range from 8 to 10 during the course of the reaction.

After standing overnight at room temperature, the reaction mixture was extracted with chloroform. The chloroform extract was acidified with hydrochloric acid and diluted with water, whereupon a slurry of crystalline solid formed. The solid N,N-bis(ar-vinylbenzyl)glycine was collected on a filter, was washed with water and dried.

N-(ar-vinylbenzyl)isovaline was made by the following procedure. A mixture of 200 ml. of water, 50 ml. of dioxane and 47 g. of isovaline, together with a trace of hydroquinone, was heated to a temperature in the range from 55° to 60° C. in a stirred reaction vessel fitted with reflux condenser and dropping funnels. Over a period of one hour, there were concurrently added to the reaction mixture 15.3 g. of ar-vinylbenzyl chloride and 31.2 g. of sodium hydroxide.

After an additional hour of stirring, the reaction mixture was diluted with an equal volume of water and then was extracted with chloroform. The extracted water solution was acidified with hydrochloric acid to a pH value of 5.5, whereupon a white solid precipitate formed. The solid was collected, washed and dried to obtain 9.7 g. of N-(ar-vinylbenzyl)isovaline.

2-(p-vinylphenyl)glycine was obtained by the following procedure. A solution of 132 g. of p-vinylbenzaldehyde in 250 ml. of methanol was added to a solution of 53.5 g. of ammonium chloride and 51.0 g. of sodium cyanide in 100 ml. of concentrated ammonium hydroxide and 200 ml. of water. To the reaction mixture was added approximately one gram of tertbutylcatechol and the reaction mixture was heated with intermittent stirring at approximately 50° C. for one hour. The resulting reaction mixture was diluted with an equal volume of water, and treated with a solution of 160 g. of sodium hydroxide in one liter of water and 250 ml. of methanol.

The resulting mixture was heated at reflux for one hour, cooled, and extracted with 200 ml. of benzene. The benzene extract was in turn extracted with a small amount of 1N sodium hydroxide solution. The sodium hydroxide extract was combined with the main aqueous reaction mixture and the combined mixture was acidified with dilute hydrochloric acid to a pH value of approximately 6. The yellow solid precipitate was collected, washed with water, and redissolved in dilute hydrochloric acid. After treatment with decolorizing carbon and filtration through filter aid, the clear acid solution was partially neutralized with sodium hydroxide solution to a pH value of approximately 6. The precipitated solid was collected, washed and dried to provide 37.9 g. of 2-(p-vinylphenyl) glycine.

N - (ar - vinylbenzyl) - 2 - (p - vinylphenyl)glycine was prepared by the following procedure. A mixture of 2 g. of 2-(p-vinylphenyl)glycine, 50 ml. of water and 10 ml. of dioxane was heated to 70° C. A total of 1.7 g. of ar-vinylbenzyl chloride was added in two portions about 15 minutes apart while the reaction mixture was stirred and the temperature was maintained about 70° C. The pH value of the reaction mixture was maintained between 9 and 11 by adding 2 ml. of 50 percent by weight sodium hydroxide solution dropwise as needed over a one hour period. After 4.5 hours of heating and stirring, the reaction mixture was cooled and filtered. The filtrate was extracted with ether and the aqueous layer was acidified with hydrochloric acid to a pH value of about 5. A precipitated pale yellow solid was collected and washed with water. The solid was redissolved in dilute aqueous alkali and reprecipitated with hydrochloric acid. The reprecipitated N - (ar -vinylbenzyl) - 2 -(p - vinylphenyl) glycine was collected, washed and dried.

N-(ar-vinylbenzyl)aspartic acid was prepared by the following procedure. A solution of 34 g. of ar-vinylbenzylamine hydrochloride in 200 ml. of water was made alkaline by addition thereto of a solution of 9.6 g. of sodium hydroxide in 80 ml. of water. The liberated ar-vinylbenzylamine was extracted from the aqueous mixture with one 60-ml. and two 40-ml. portions of ether. After drying over anhydrous $Na_2SO_4$, the combined ether solutions were added to 68.8 g. of diethyl maleate. The resulting mixture was allowed to stand at room temperature for six days, after which 200 ml. of water and 16 ml. of concentrated hydrochloric acid were added with agitation. The ethereal layer was withdrawn and the aqueous layer was extracted with 20 ml. of ether. The aqueous layer was made strongly basic with 50 percent by weight sodium hydroxide, thereby precipitating an oil. The oil was extracted from the aqueous solution with two 20-ml. portions of ether. The ether extract was dried over anhydrous $Na_2SO_4$. Evaporation of the ether produced 49.1 g. of crude diethyl N-(ar-vinylbenzyl)aspartate. A mixture of 49.1 g. of the crude ester, 16.1 g. NaOH, and 150 ml. of water was heated under reflux for approximately three hours until the oily layer disappeared. The hydrolysis mixture was acidified to a pH value of approximately 2 by addition thereto of hydrochloric acid. The solid precipitate was collected, washed, and recrystallized from 70 ml. of boiling water. The recrystallized product was collected, washed and dried to obtain 30 g. of N-(ar-vinylbenzyl)aspartic acid.

Some of the vinylphenyl aliphatic aminocarboxylic acids are prepared by reaction of an ar-vinylbenzylamino compound having at least one hydrogen atom on the amino group with a haloacetic acid in an alkaline aqueous reaction mixture. For instance, the preparation of 2-(p-vinylphenyl)iminodiacetic acid and 2-(p-vinylphenyl) nitrilotriacetic acid was carried out as follows. To a mixture of 3 g. of 2-(p-vinylphenyl)glycine, 3 g. of sodium carbonate, and 25 ml. of water, were added a solution of 4.5 g. of sodium chloroacetate in 10 ml. of water and a trace of hydroquinone. The resulting mixture was heated at temperatures in the range from 70° to 80° C. for 8 hours, during which another 3 g. of sodium carbonate was added to the reaction mixture. After filtering the reaction mixture, the filtrate was acidified to a pH value of 2.5 with hydrochloric acid and was concentrated by evaporation in an air stream. The solid precipitate was collected, washed and dried. This product was a mixture of 2-(p-vinylphenyl)iminodiacetic acid (condensation product of one molecular proportion of chloroacetic acid) and 2-(p-vinylphenyl)nitrilotriacetic acid (condensation product of two molecular proportions of chloroacetic acid). Recrystallization from hot water caused the separation of the mixture into two fractions, the least soluble product being substantially the 2-(p-vinylphenyl)iminodiacetic acid. The more soluble product was substantially the 2-(p-vinylphenyl)nitrilotriacetic acid.

Any of the many known polymerizable ethylenically unsaturated compounds can be copolymerized with the vinylphenyl aliphatic aminocarboxylic acid compounds to make the interpolymers of this invention. Among such known polymerizable ethylenically unsaturated compounds are the alkenylaromatic compounds, i.e. the styrene compounds, the ethylenically unsaturated acids and derivatives such as the acrylic acids and salts, acrylic esters, acrylic nitriles, acrylic amides, acrylic anhydrides, maleic esters, maleic anhydride, maleic acid polyesters, unsaturated alcohol esters, unsaturated ketones, unsaturated ethers, and other compounds containing one or more ethylenic linkages capable of addition polymerization. Specific examples of such ethylenically unsaturated compounds are styrene, α-methylstyrene, ar-methylstyrene, ar-ethylstyrene, α,ar-dimethylstyrene, ar,ar-dimethylstyrene, divinylbenzene, vinylnaphthalene, divinylnaphthalene, vinylbenzenesulfonic acid, divinylbenzenesulfonic acid, hydroxystyrene, methoxystyrene, aminostyrene, cyanostyrene, acetylstyrene, monochlorostyrene, dichlorostyrene and other halostyrenes, acrylic acid and salts, methacrylic acid and salts, methyl methacrylate, ethyl acrylate, glycol diacrylate, hexyl acrylate, phenyl acrylate, allyl acrylate, acrylonitrile, methacrylonitrile, acrylamide, methacrylamide, acrylanilide, acrylic anhydride, ethyl α-chloroacrylate, ethyl maleate, maleic anhydride, polyglycol maleate, diallyl fumarate, vinyl acetate, vinyl propionate, vinyl butyrate, vinyl benzoate, vinyl chloride, vinyl bromide, vinylidene chloride, vinylidene bromide, vinylidene cyanide, vinyl methyl ketone, isopropenyl ketone, vinyl carbazole, vinyl ethyl ether, divinyl ether, isobutylene, 1,3-butadiene, isoprene, and the like.

The interpolymers of this invention are prepared by subjecting to conditions conducive to polymerization a composition comprising an intimate mixture of an appreciable proportion of at least one of the polymerizable vinylphenyl aliphatic α- or β-aminocarboxylic acid compounds and an appreciable proportion of at least one other polymerizable ethylenically unsaturated compound, both as hereinbefore identified. The proportions of the diverse kinds of polymerizable monomers in the mixture can, of course, be varied widely depending upon the kind of copolymer product desired. Compositions predominating in one or more vinylphenyl aliphatic amino-carboxylic acid compounds will give rise to copolymers whose properties are predominately those of the polymerized vinylphenyl aliphatic aminocarboxylic acid as advantageously modified in kind and degree by the other polymerizable ethylenically unsaturated compound chemically combined in the copolymer. Those compositions that predominate in such other polymerizable ethylenically unsaturated monomer will give rise to copolymer products whose properties are predominately those of the polymerized ethylenically unsaturated monomer as advantageously modified in kind and degree by the vinylphenyl aliphatic aminocarboxylic acid compound chemically combined therein. In some instances the amount of one of these kinds of materials required to significantly modify the polymer properties is extremely small. For instance, only a small amount, e.g. 0.5 percent by weight, of divinylbenzene in a vinylphenyl aliphatic aminocarboxylic acid provides a copolymer having an appreciable degree of crosslinking thereby decreasing its solubility and swellability by aqueous media. On the other hand, only a small amount, e.g. 0.5 percent by weight, of a vinylphenyl aliphatic aminocarboxylic acid in a hydrophobic ethylenically unsaturated monomer provides a copolymer having an appreciable increase in hydrophilic properties. In most instances, the copolymers of this invention are derived from starting mixtures containing from 1 to 99 parts by weight of each of the starting monomers.

The polymerization of the starting mixture of monomers can be carried out in mass, i.e. in the absence of any diluent, in solution in solubilizing liquids, or while suspended in non-solvent liquids. The polymerization is accelerated by heat and is catalyzed by exposure to activating radiations and by contact with free radical catalysts such as α,α'-azobisisobutyronitrile and the peroxygen compounds such as cumene hydroperoxide and potassium persulfate.

The following examples illustrate the invention but are not to be construed as limiting its scope.

*Example 1*

A solution containing 0.5 g. of N-(ar-vinylbenzyl)iminodiacetic acid, 0.5 g. of sodium p-vinylbenzenesulfonate, 0.001 g. of sodium persulfate and 100 ml. of water was heated to reflux temperature and refluxed for 22 hours. There was thereby obtained a clear, slightly viscous solution which was acidified to a pH value of approximately 1 by addition thereto of hydrochloric acid. The white solid copolymer of N-(ar-vinylbenzyl)iminodiacetic acid and p-vinylbenzesulfonic acid was collected, washed and dried. The dried resinous copolymer contained some sodium chloride and had the following analyses:

Nitrogen=2.80 percent by weight
Sulfur =5.52 percent by weight

The solid resinous copolymer after drying was insoluble in water and aqueous media. The acid form of the resin could be converted to salt forms by reaction with bases such as ammonium bases or metal bases. Chelate structures of the iminodiacetic acid group were formed in the case of salts of metals that have coordinate covalent bonds.

*Example 2*

A mixture of 92 parts by weight of N-(ar-vinylbenzyl)iminodiacetic acid and 8 parts by weight of sodium ar,ar-divinylbenzenesulfonate was dissolved in about three times its weight of aqueous sodium hydroxide containing enough sodium hydroxide to dissolve the monomers while applying heat to obtain a clear solution. The solution was cooled to room temperature and concentrated hydrochloric acid was added to adjust the pH value of the solution to 8. To this solution was added 0.33 g. of sodium persulfate, and the resulting solution was heated on a steam bath overnight (about 16 hours) to produce a gelled product. After separating most of the water, the gel was washed with acetone and dried. The crosslinked resin product was insoluble in water but was highly swollen in aqueous media. The extent of swelling in aqueous media was least at pH values near the isoelectric point, greater in more acidic media and greatest in strongly alkaline media.

*Example 3*

In place of the 8 parts by weight of sodium ar,ar-divinylbenzenesulfonate in Example 2, there was employed 4 parts by weight thereof and 4 parts by weight of N,N-bis(ar-vinylbenzyl) glycine, the procedural steps being like those set forth in Example 2. A crosslinked gelled interpolymer of N-(ar-vinylbenzyl)iminodiacetic acid, N,N-bis-ar-vinylbenzyl)glycine, and ar,ar-divinylbenzene sulfonic acid was obtained. The properties of this resin product were similar to those of the product obtained in Example 2.

*Example 4*

To a solution of 3.5 g. of N-(ar-vinylbenzyl)iminodiacetic acid in 16.5 ml. of water was added sodium hydroxide until the pH value of the solution was 5.5. A solution of 1.0 g. of acrylamide in water at a pH value of 5.5 was also prepared and added to the solution of N-(ar-vinylbenzyl)iminodiacetic acid. The resulting mixture was heated to 65° C. and deaerated by blowing with nitrogen for one hour. While continuing the nitrogen flow, 0.05 g. of α,α'-azobisisobutyronitrile was added to the solution and the temperature was maintained at 65° C. After 45 minutes the nitrogen flow was stopped. After another hour at 65° C., the temperature was raised to 95° C. for three hours. The resulting gelled product was stirred in 500 ml. of acetone for two hours to obtain a white, crystalline resin which was collected on a filter. The resin was then dispersed in 200 ml. of acetone. After standing in acetone for 16 hours, the resin was collected and dried under vacuum to obtain a substantially quantitative yield of the copolymer of N-(ar-vinylbenzyl)iminodiacetic acid and acrylamide. This resin formed strong chelate structures with cupric and other chelate-forming metal ions.

*Example 5*

To an alkaline aqueous solution that was $3.26 \times 10^{-3}$ M in respect to N,N-bis(ar-vinylbenzyl)glycine, sodium salt, and $3.26 \times 10^{-3}$ M in respect to sodium acrylate, at a pH value of 10, there was added $\alpha,\alpha'$-azobisisobutyronitrile in amount corresponding to 0.49 percent by weight of the combined monomers. After heating at reflux temperature for two hours, the resulting gel was acidified with HCl to a pH value of 2. The precipitated resinous copolymer of N,N-bis (ar-vinylbenzyl)glycine and acrylic acid was collected, washed with 1 N HCl and acetone and dried. The resin product formed chelate structures with cupric ions.

*Example 6*

A solution in benzene $2.62 \times 10^{-3}$ M in respect to diethyl N-(ar-vinylbenzyl)aspartate and $2.32 \times 10^{-3}$ M in respect to vinyl acetate and containing benzoyl peroxide in amount corresponding to 0.5 percent by weight of the combined monomers was heated at reflux temperature for 3 hours. The benzene was removed by distillation and evaporation under vacuum to obtain a solid resinous copolymer of diethyl N-(ar-vinylbenzyl)aspartate and vinyl acetate. Hydrolysis of the ester linkages with alkali and acidification produced the corresponding resinous copolymer of N-(ar-vinylbenzyl)aspartic acid and vinyl alcohol.

*Example 7*

To a solution of 60 parts by weight of methanol and 40 parts of water were added 2-(p-vinylphenyl)glycine and methyl methacrylate, each in amount corresponding to $1.19 \times 10^{-2}$ gram-mole per liter, and $\alpha,\alpha'$-azobisisobutyronitrile in amount corresponding to 1.28 percent by weight of the combined monomers. After heating at reflux temperature for 4 hours, the resulting solution was concentrated by distillation and evaporation and the residue was diluted with ethanol. The precipitated resinous copolymer of 2-(p-vinylphenyl)-glycine and methyl methacrylate was collected and dried.

*Example 8*

A mixture of 95 parts by weight diethyl N-(ar-vinylbenzyl)-aspartate, 5 parts by weight of technical divinylbenzene (approximately 55 percent by weight divinylbenzene, 35 percent ethylstyrene and 10 percent diethylbenzene), and 0.1 part of $\alpha,\alpha'$-azobisisobutyronitrile was heated on a steam bath for approximately 18 hours to form a solid resinous crosslinked copolymer. The comminuted resin was suspended in 4 N $H_2SO_4$ and heated at reflux temperature for 16 hours to hydrolyze the ester groups and obtain particles of a solid resinous copolymer of N-(ar-vinylbenzyl)aspartic acid and divinylbenzene.

*Example 9*

A water solution that was $4.02 \times 10^{-4}$ M in respect to N-(ar-vinylbenzyl)iminodiacetic acid and $1.865 \times 10^{-1}$ M in respect to acrylonitrile and that contained sodium persulfate in amount corresponding to 0.25 percent by weight of the combined monomers was allowed to stand at 24° C. for 48 hours to produce a water solution of a soluble copolymer of N-(ar-vinylbenzyl)iminodiacetic acid and acrylonitrile.

A starting water solution similar to the one just described but not containing any sodium persulfate or other added catalyst was irradiated with ultraviolet light at 24° C. for 48 hours to produce the same result, i.e. formation of a water solution of a soluble copolymer of N-(ar-vinylbenzyl) iminodiacetic acid and acrylonitrile.

A starting solution in dimethyl formamide as a solvent and $1.0 \times 10^{-3}$ M in respect to N-(ar-vinylbenzyl)iminodiacetic acid and $9.43 \times 10^{-2}$ M in respect to acrylonitrile and containing benzoyl peroxide in amount corresponding to 0.25 percent by weight of the monomers was held at 24° C. for 48 hours to produce a copolymer of N-(ar-vinylbenzyl)iminodiacetic acid and acrylonitrile that was soluble in water.

In the foregoing Examples 1–6, and 8–9, the ar-vinylbenzyl starting material was a mixture of isomers consisting essentially of from 60 to 65 percent by weight of the p-vinylbenzyl compound and from 40 to 35 percent by weight of the o-vinylbenzyl compound. In Example 7, the starting material was essentially the para isomer. In place of the particular isomers or mixtures of isomers employed in these examples there can be used starting materials corresponding to any of the individual o-, m-, or p-vinyl substituted phenyl or benzyl compounds or mixtures of two or more of such isomers to obtain the corresponding polymers of such starting materials.

The products of this invention are all addition polymers comprising the monomeric starting materials in polymerically combined form and are in most instances hard, brittle, solid resins. The properties of these products vary greatly depending upon the kind and proportion of starting materials that are polymerically combined. In polymers derived from starting mixtures containing only a small proportion of a vinylphenyl aliphatic aminocarboxylic acid, the presence of the aminocarboxylic acid group makes the base polymer more hydrophilic and polar. Such groups in the polymer permit the introduction into the polymer structure of dyestuffs or metal ions that can serve as mordants for dyes.

Polymers that contain at least 50 percent by weight of one or more vinylphenyl aliphatic $\alpha$- or $\beta$-aminocarboxylic acid compounds polymerically combined are particularly useful for chelating metal ions. The resins that are insoluble in water are advantageously employed to separate chelate-forming metal ions from solutions containing the same, even extremely dilute solutions, to separate chelate-forming metal ions from non-chelate-forming metal ions, and to separate chelate-forming metal ions from each other on the basis of the strength and stability of the respective chelate structures. Chelate-forming metal ions can be removed from their liquid solutions by stirring a quantity of one of these insoluble chelating resins in finely divided form into such ionic solutions, forming the metal chelate of the resin, and separating the metal-containing solid resin from the residual liquid, e.g. by filtration or decantation. Alternatively, the particulate solid resin can be dispersed as a permeable bed or layer, and the chelate-forming metal solution can be passed through such permeable bed or layer, whereby the chelate-forming metal ions react with and are retained by the solid resin in the bed. Since most of the metal chelates are less stable at low pH values, the metal-containing solid chelated resin can be regenerated by washing with strong acids, e.g. hydrochloric acid, whereby the metal ions are removed from the resin and can be separately recovered if desired.

As an illustration of such use of these chelating resins, the following tests were carried out. Particles of the solid, water-insoluble, resinous copolymer of N-(ar-vinylbenzyl)aspartic acid and divinylbenzene that was obtained in accordance with the description in Example 8 were placed in an elongated tube to provide a permeable bed of such particles of resin. Into and through the resin bed was passed a stream of aqueous solution having the following composition and a pH value of 4.5.

| | M |
|---|---|
| KCl | 1 |
| Acetic acid | 0.1 |
| Potassium acetate | 0.1 |
| CuCl$_2$ | 0.1 |

The effluent salt solution was free of cupric ions. The metal-containing resin was regenerated by passing aqueous hydrochloric acid through the resin bed, cupric chloride being removed in the effluent.

Instead of passing an aqueous cupric ion solution into the resin bed, aqueous solutions containing (in successive separate tests) ions of cobalt (II), nickel (II), and iron (III), respectively, were passed into the regenerated resin bed. In each instance, the metal ion was retained by the resin in chelated structure, and the aqueous effluent was devoid of that metal ion. In each instance the metal-containing resin was regenerated with strong hydrochloric acid.

We claim:

1. A resinous addition interpolymer containing recurring units in appreciable amounts corresponding to at least 0.5 percent by weight of each of two different polymerizable ethylenically unsaturated compounds one of which is a vinylphenyl aliphatic aminocarboxylic acid compound having the formula

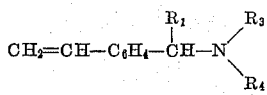

wherein the symbol R$_1$ represents a substituent selected from the group consisting of hydrogen and carboxyl-containing radicals, each of the symbols R$_3$ and R$_4$ individually represents a substituent selected from the group consisting of hydrogen, hydrocarbon radicals, and carboxyl-containing radicals, and at least one of the substituents represented by the symbols R$_1$, R$_3$, and R$_4$ contains a carboxyl group, and the other of which is a polymerizable ethylenically unsaturated compound containing a radical selected from the group consisting of vinyl and isopropenyl radicals attached to a radical selected from the group consisting of carboxy, alkoxycarbonyl, lower carboxylate, carbamyl, cyano, aryl, and sulfoaryl radicals.

2. A method of making a resinous addition interpolymer which comprises polymerizing by free-radical generating means at temperatures between about 20° C. and about 100° C. a polymerizable mixture comprising appreciable amounts corresponding to at least 0.5 percent by weight of the mixture of each of two different polymerizable ethylenically unsaturated compounds one of which is a vinylphenyl aliphatic aminocarboxylic acid compound having the formula

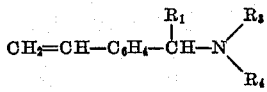

wherein the symbol R$_1$ represents a substituent selected from the group consisting of hydrogen and carboxyl-containing radicals, each of the symbols R$_3$ and R$_4$ individually represents a substituent selected from the group consisting of hydrogen, hydrocarbon radicals, and carboxyl-containing radicals, and at least one of the substituents represented by the symbols R$_1$, R$_3$, and R$_4$ contains a carboxyl group, and the other of which is a polymerizable ethylenically unsaturated compound containing a radical selected from the group consisting of vinyl and isopropenyl radicals attached to a radical selected from the group consisting of carboxy, alkoxycarbonyl, lower carboxylate, carbamyl, cyano, aryl, and sulfoaryl radicals.

3. A resinous addition interpolymer according to claim 1 containing recurring units in appreciable amounts corresponding to at least 0.5 percent by weight of the specified vinylphenyl aliphatic aminocarboxylic acid compound and at least 0.5 percent by weight of a divinylbenzene.

4. A resinous addition interpolymer according to claim 1 containing recurring units in appreciable amounts corresponding to at least 0.5 percent by weight of the specified vinylphenyl aliphatic aminocarboxylic acid compound and at least 0.5 percent by weight of a vinylsulfobenzene.

5. A resinous addition interpolymer according to claim 1 containing recurring units in appreciable amounts corresponding to at least 0.5 percent by weight of the specified vinylphenyl aliphatic aminocarboxylic acid compound and at least 0.5 percent by weight of acrylonitrile.

6. A resinous addition interpolymer according to claim 1 containing recurring units in appreciable amounts corresponding to at least 0.5 percent by weight of the specified vinylphenyl aliphatic aminocarboxylic acid compound and at least 0.5 percent by weight of acrylamide.

7. A resinous addition interpolymer according to claim 1 wherein the vinylphenyl aliphatic aminocarboxylic acid compound is a N-(ar-vinylbenzyl)iminodiacetic acid compound in amount corresponding to from 50 to 99.5 percent by weight of the recurring units of the interpolymer.

8. A resinous addition interpolymer according to claim 1 wherein the vinylphenyl aliphatic aminocarboxylic acid compound is a N-(ar-vinylbenzyl)aspartic acid compound in amount corresponding to from 50 to 99.5 percent by weight of the recurring units of the interpolymer.

9. A resinous addition interpolymer containing recurring units corresponding to at least 0.5 percent by weight of a divinylbenzene and at least 50 percent by weight of a N-(ar-vinylbenzyl)iminodiacetic acid compound.

10. A resinous addition interpolymer containing recurring units corresponding to at least 0.5 percent by weight of a divinylbenzene and at least 50 percent by weight of a N-(ar-vinylbenzyl)aspartic acid compound.

11. A resinous addition interpolymer containing recurring units corresponding to at least 0.5 percent by weight of acrylamide and at least 0.5 percent by weight of a N-(ar-vinylbenzyl)iminodiacetic acid compound.

12. A resinous addition interpolymer containing recurring units corresponding to at least 0.5 percent by weight of acrylamide and at least 0.5 percent by weight of a N-(ar-vinylbenzyl)aspartic acid compound.

References Cited in the file of this patent

UNITED STATES PATENTS

| 2,500,025 | Dickey et al. | Mar. 7, 1950 |
| 2,632,001 | McMaster et al. | Mar. 17, 1953 |
| 2,694,702 | Jones | Nov. 16, 1954 |
| 2,697,080 | D'Alelio | Dec. 14, 1954 |